(12) United States Patent
Kamioka et al.

(10) Patent No.: US 8,095,283 B2
(45) Date of Patent: Jan. 10, 2012

(54) TRANSMISSION CONTROL APPARATUS

(75) Inventors: Nozomu Kamioka, Chiyoda-ku (JP);
Shiro Yonezawa, Chiyoda-ku (JP);
Takeru Okabe, Chiyoda-ku (JP);
Tomohisa Shoda, Chiyoda-ku (JP);
Masaki Horii, Chiyoda-ku (JP);
Yasufumi Ogawa, Chiyoda-ku (JP);
Osamu Ishikawa, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 520 days.

(21) Appl. No.: 12/367,139

(22) Filed: Feb. 6, 2009

(65) Prior Publication Data

US 2009/0265068 A1 Oct. 22, 2009

(30) Foreign Application Priority Data

Apr. 18, 2008 (JP) ................... 2008-109111

(51) Int. Cl.
*B60W 10/02* (2006.01)
*G06F 17/00* (2006.01)
(52) U.S. Cl. ......................... 701/51; 74/730.1
(58) Field of Classification Search .............. 701/51, 701/54, 67; 74/730.1, 473.16, 325, 331; 192/52.1, 103
See application file for complete search history.

(56) References Cited

U.S. PATENT DOCUMENTS

| 5,950,781 A * | 9/1999 | Adamis et al. ............. 192/3.61 |
| 6,909,955 B2 * | 6/2005 | Vukovich et al. ............. 701/51 |
| 7,946,953 B2 * | 5/2011 | Koga et al. ................. 477/78 |
| 2002/0002878 A1 * | 1/2002 | Petrzik ..................... 74/730.1 |
| 2008/0127766 A1 * | 6/2008 | Ogasawara .............. 74/473.16 |
| 2008/0215213 A1 * | 9/2008 | Klump ........................ 701/51 |

FOREIGN PATENT DOCUMENTS

JP 2006-132574 A 5/2006

OTHER PUBLICATIONS

Uwe Wagner, et al., "Electromotoric actuators for double clutch transmissions—Best efficiency by itself," 8th Luk Symposium 2006, Luk GmbH & Co., Germany, pp. 138-153.

* cited by examiner

*Primary Examiner* — Thomas Black
*Assistant Examiner* — Marthe Marc-Coleman
(74) *Attorney, Agent, or Firm* — Sughrue Mion, PLLC (57) ABSTRACT

A transmission control apparatus detects a drop in power transmission performance of a clutch actuator, and prevents a failure thereof. When power transmission performance drop detecting means detects a drop in power transmission performance of a first clutch even if a power transmission instruction is given to a first clutch actuator, power transmission in a power transmission path through a first geared transmission mechanism is inhibited, and power transmission in a power transmission path through a second geared transmission mechanism is carried out. When the power transmission performance drop detecting means detects a drop in power transmission performance of a second clutch even if the power transmission instruction is given to a second clutch actuator, power transmission in the power transmission path through the second geared transmission mechanism is inhibited, and power transmission in the power transmission path through the first geared transmission mechanism is carried out.

6 Claims, 9 Drawing Sheets

TRANSMISSION CONTROL APPARATUS

BACKGROUND OF THE INVENTION

1. Field of the Invention

The present invention relates to a transmission control apparatus that controls the transmission mounted in a vehicle, such as an automobile, and, more particularly, to a transmission control apparatus that controls the transmission which separates power from an engine to two power transmission paths each having an independent clutch and an independent transmission mechanism.

2. Description of the Related Art

There has been a so-called twin-clutch transmission which separates power from an engine to two power transmission paths each having an independent clutch and an independent transmission mechanism, and performs a transmission operation to transmit power from the input shaft to the output shaft. This twin-clutch transmission uses an electric motor as an actuator to actuate the clutch (see, for example, Non-patent Document 1 ("Electromotoric actuators for double clutch transmissions" which is the document distributed in "8th Luk Symposium 2006") held by Luk GmbH & Co., Germany)).

There is known a twin-clutch transmission control apparatus which controls a twin-clutch transmission so that when one of the transmission groups fails, the other transmission group is used to carry out the transmission operation (see, for example, Patent Document 1 (JP-A-2006-132574).

The twin-clutch transmission disclosed in the Non-patent Document 1 uses an electric motor as a clutch actuator, and uses a normal-open clutch which transmits power from the input shaft to the output shaft at the time the electric motor is energized (operated), and does not transmit power from the input shaft to the output shaft at the time the electric motor is not energized (not operated). When the electric motor is energized to transmit the power from the input shaft, a current corresponding to the supply voltage flows. A torque is generated in the electric motor according to the size of the current which has flowed in the electric motor. The greater the generated torque is, the greater the torque to be transmitted to the output shaft of the clutch from the input shaft thereof.

An electric motor generally consumes part of the electric energy as heat, so that as the energization time gets longer, the quantity of energy to be given to the electric motor becomes larger and the temperature of the electric motor rises to the temperature at which heat balance with the ambient temperature is established.

The size of the torque of the electric motor is determined by the magnetic flux that is generated by the current having flowed across the coil in the electric motor, and the magnetic flux that is generated by the permanent magnet disposed near the coil, and the permanent magnet has a property such that as the temperature of the permanent magnet rises, the size of the magnetic flux that is generated becomes smaller. As the energization of the electric motor raises the temperature of the coil, therefore, the temperature of the permanent magnet rises, so that even with the same electric energy supplied to the electric motor, the temperature of the permanent magnet rises, thus making the size of the torque generated in the electric motor smaller. As a result, the torque generated in the electric motor becomes smaller than the torque needed to hold the clutch, so that when the electric motor becomes a performance-dropped state, the power transmission performance of the clutch becomes lower.

When the power transmission performance of the clutch becomes lower, clutch slipping occurs, causing friction to generate heat at the clutch portion. The heat warms up near the clutch, further increasing the temperature of the nearby electric motor. The coil of the electric motor is made of a metal, and has its surface coated with an insulator. When the internal temperature of the coil becomes a failure limit temperature or higher, the high temperature causes a chemical reaction of the coat of the insulator, which damages the insulation of the conductive wire or disconnects the soldered portion of the coil, resulting in a failure of the electric motor.

As described above, when the performance-dropped state of the electric motor continues and the motor temperature rises, a failure, such as line disconnection or short-circuiting, is likely to occur. To prevent a failure, therefore, it is necessary to prevent the performance-dropped state of the electric motor from continuing for a long period and prevent the temperature of the electric motor from becoming equal to or higher than the failure limit temperature.

When a failure in one of electric motors used in the twin-clutch transmission cannot be prevented and one electric motor fails, this electric motor cannot generate a torque, so that the clutch which is operated by the electric motor cannot transmit power from the input shaft to the output shaft. Accordingly, gear shifting of the transmission is carried out only with the clutch that includes the other electric motor, so that the gear ratio of the transmission cannot be set to one which ensures a high fuel consumption effect. Because the adequate gear ratio cannot be selected, the acceleration intended by a driver may not be actuated or the high-speed driving may make the engine sound louder, which is the deterioration of the drivability. Further, the gear shifting operation at a gear ratio far different from the normal one would bring about a problem of a continuous state where, for example, the gear shifting shock would become greater.

In addition, after instructing the operation of the clutch actuator, the transmission control apparatus disclosed in the Patent Document 1 detects if a clutch actuator has actually been operated through stroke detection or the like to determine the occurrence of a failure. The transmission control apparatus disclosed in the Patent Document 1 has problems such that although the transmission control apparatus can detect a failure after the clutch actuator has failed, it cannot detect that the clutch actuator is in a performance-dropped state while the driving of the clutch actuator is being instructed, and thus keeps operating until the clutch actuator fails, so that the failure cannot be prevented.

SUMMARY OF THE INVENTION

Accordingly, the present invention has been made to overcome the foregoing problems, and it is an object of the invention to provide a transmission control apparatus which can detect a drop in power transmission performance of a clutch actuator, and prevent a failure thereof.

To achieve the object, according to one aspect of the invention, there is provided a transmission control apparatus for controlling a transmission, which has an engine output shaft that transmits an output torque of an engine, a first geared transmission mechanism that transmits power of the engine output shaft to a tire, a second geared transmission mechanism that transmits the power of the engine output shaft to the tire, a first clutch provided in a power transmission path extending from the engine output shaft to the tire through the first geared transmission mechanism to transmit or disconnect power, a second clutch provided in a power transmission path extending from the engine output shaft to the tire through the second geared transmission mechanism to transmit or disconnect power, a first clutch actuator that is actuated by an electric signal to operate the first clutch, and a second clutch actuator that is actuated by an electric signal to operate the second clutch, the transmission control apparatus including a clutch actuator controller that controls the first clutch actuator and the second clutch actuator, and power transmission performance drop detecting means that detects or predicts a drop in power transmission performance of the first clutch actuator or the second clutch actuator, wherein when the power transmission performance drop detecting means detects a drop in power transmission performance of the first clutch even if the clutch actuator controller is giving an instruction of power transmission to the first clutch actuator, power transmission in the power transmission path extending from the engine output shaft to the tire through the first geared transmission mechanism is inhibited, and power transmission in the power transmission path extending from the engine output shaft to the tire through the second geared transmission mechanism is enabled, and when the power transmission performance drop detecting means detects a drop in power transmission performance of the second clutch even if the clutch actuator controller is giving an instruction of power transmission to the second clutch actuator, power transmission in the power transmission path extending from the engine output shaft to the tire through the second geared transmission mechanism is inhibited, and power transmission in the power transmission path extending from the engine output shaft to the tire through the first geared transmission mechanism is enabled.

The transmission control apparatus according to the invention predicts or detects clutch slipping which is caused by a reduction in power transmission performance, thus making it possible to prevent the clutch actuator from failing and prevent the failure-oriented deterioration of fuel consumption or deterioration of drivability.

The foregoing and other objects, features, aspects, and advantages of the present invention will become more apparent from the following detailed description of the invention when taken in conjunction with the accompanying drawings.

DETAILED DESCRIPTION OF THE PREFERRED EMBODIMENTS

Transmission control apparatuses according to preferred embodiments of the present invention will be described below with reference to the accompanying drawings. The invention is not limited to those embodiments.

First Embodiment

Figure 1:
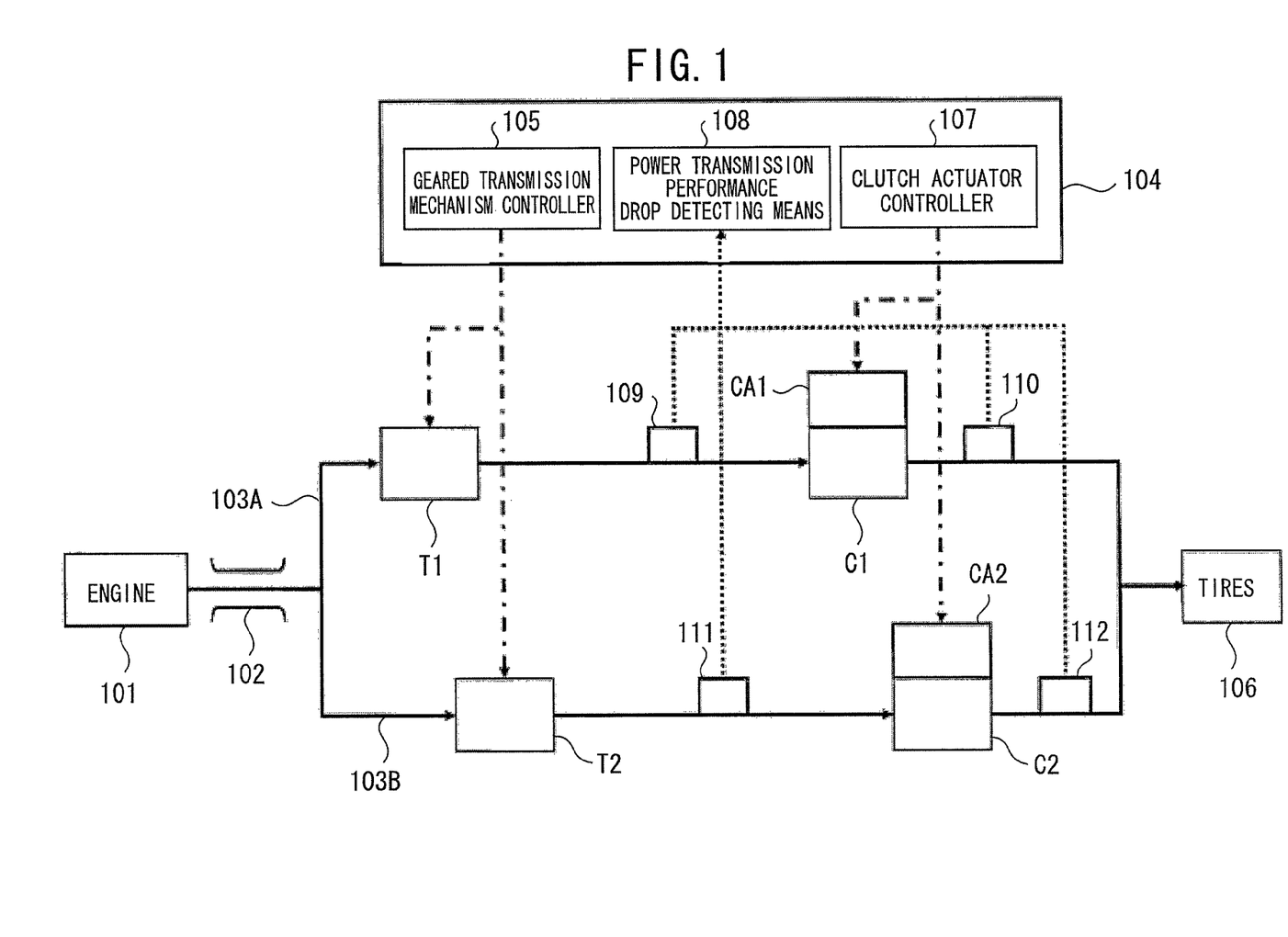
FIG. 1 is a system configurational diagram illustrating a transmission control apparatus according to a first embodiment of the present invention.

FIG. 1 is a system configurational diagram illustrating a transmission control apparatus according to a first embodiment of the invention. In FIG. 1, an engine 101 outputs power and transmits the power to an engine output shaft 102. The power transmitted to the engine output shaft 102 is transmitted to a first geared transmission mechanism T1 through a first power transmission path 103A. The first geared transmission mechanism T1 can perform a gear shifting operation as the power is transmitted by the gear that is specified by a geared transmission mechanism controller 105 which constitutes a transmission control apparatus 104.

Likewise, the power transmitted to the engine output shaft 102 is transmitted to a second geared transmission mechanism T2 through a second power transmission path 103B. The geared transmission mechanism controller 105 also gives an instruction to the second geared transmission mechanism T2 to enable a gear shifting operation.

The powers output from the first geared transmission mechanism T1 and the second geared transmission mechanism T2 are transmitted to tires 106 via a first clutch C1 and a second clutch C2, respectively. The first clutch C1 and the second clutch C2 are configured to be actuated by a first clutch actuator CA1 and a second clutch actuator CA2, respectively. The first clutch actuator CA1 and the second clutch actuator CA2 are controlled by a clutch actuator controller 107, which constitutes the transmission control apparatus 104, to carry out power transmission or disconnection in the first clutch C1 and the second clutch C2. Accordingly, the power from the engine 101 is transmitted through the engine output shaft 102, and is then transmitted through the first power transmission path 103A and the second power transmission path 103B to the first clutch C1 and the second clutch C2 via the first geared transmission mechanism T1 and the second geared transmission mechanism T2, respectively. One of the first geared transmission mechanism T1 and the second geared transmission mechanism T2 is selected by the first clutch C1 and the second clutch C2 to transmit the power to the tires 106.

The transmission control apparatus 104 incorporates power transmission performance drop detecting means 108 which detects a drop in the torque transmitting performance in the first power transmission path 103A or the second power transmission path 103B. Specifically, the power transmission performance drop detecting means 108 is configured to detect drops in the torque transmitting performances in the first power transmission path 103A and the second power transmission path 103B from information from a first rotation sensor 109, a second rotation sensor 110, a third rotation sensor 111 and a fourth rotation sensor 112, which are disposed before and after the first clutch C1 and the second clutch C2 to measure the rotational speeds in the first power transmission path 103A and the second power transmission path 103B. In FIG. 1, solid lines indicate power transmission paths, one-dot chain lines indicate control signal paths, and broken lines indicate sensor signal paths.

Figure 2:
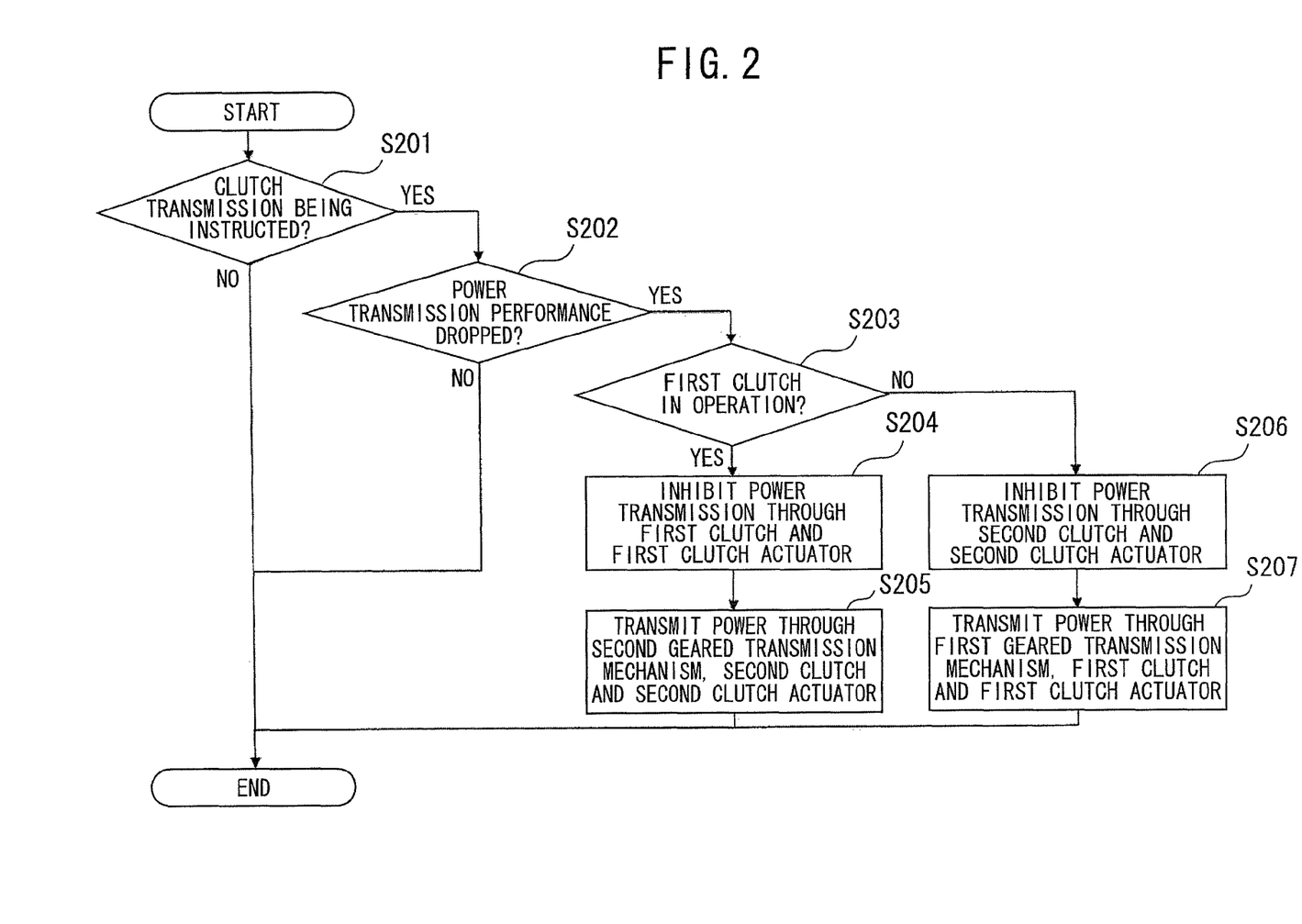
FIG. 2 is a flowchart illustrating the operation of the transmission control apparatus according to the first embodiment of the invention.

FIG. 2 is a flowchart illustrating the operation of the transmission control apparatus 104 according to the first embodiment of the invention. Referring to FIG. 2, in step S201, it is determined whether the clutch actuator controller 107 is instructing the first clutch actuator CA1 and the second clutch actuator CA2, or the first clutch C1 and the second clutch C2 to transmit the torque. When the determination is YES, the flow proceeds to step S202. Otherwise, the subroutine is terminated.

In step S202, the power transmission performance drop detecting means 108 determines whether the power transmission performance has dropped. When the power transmission performance has dropped, the flow proceeds to step S203. Otherwise, the subroutine is terminated.

In step S203, it is determined whether the first clutch C1 is in operation. When the first clutch C1 is in operation, the flow proceeds to step S204. Otherwise, the flow proceeds to step S206.

In step S204, power transmission using the first clutch C1 and the first clutch actuator CA1 is inhibited, and the flow proceeds to step S205.

In step S205, power transmission is carried out using the second clutch C2 and the second clutch actuator CA2, and the subroutine is terminated.

In step S206, power transmission using the second clutch C2 and the second clutch actuator CA2 is inhibited, and the flow proceeds to step S207.

In step S207, power transmission is carried out using the first clutch C1 and the first clutch actuator CA1, and the subroutine is terminated.

Although the clutches C1, C2 explained in the foregoing description of the first embodiment are configured to change the gears for the power from the engine 101 through the geared transmission mechanisms T1, T2 and then transmit or disconnect power to the tires 106, the positions of the geared transmission mechanisms T1, T2 and the positions of the clutches C1, C2 may of course be interchanged so that power transmission and disconnection are carried out near the engine 101.

As apparent from the above, the transmission control apparatus 104 according to the first embodiment has the power transmission performance drop detecting means 108, and, upon detection of the performance-dropped state of the clutch actuator CA1, CA2, inhibits the use of the clutch actuator CA1, CA2 until the clutch actuator returns from the performance-dropped state, and allows the other clutch actuator to be used, thereby bringing about an effect of preventing a failure of the clutch actuator whose performance-dropped state is detected.

Second Embodiment

Next, a transmission control apparatus according to a second embodiment of the invention will be described referring to FIG. 3. Because the system configuration is similar to that of the transmission control apparatus explained in the foregoing description of the first embodiment, FIG. 1 will be used.

Figure 3:
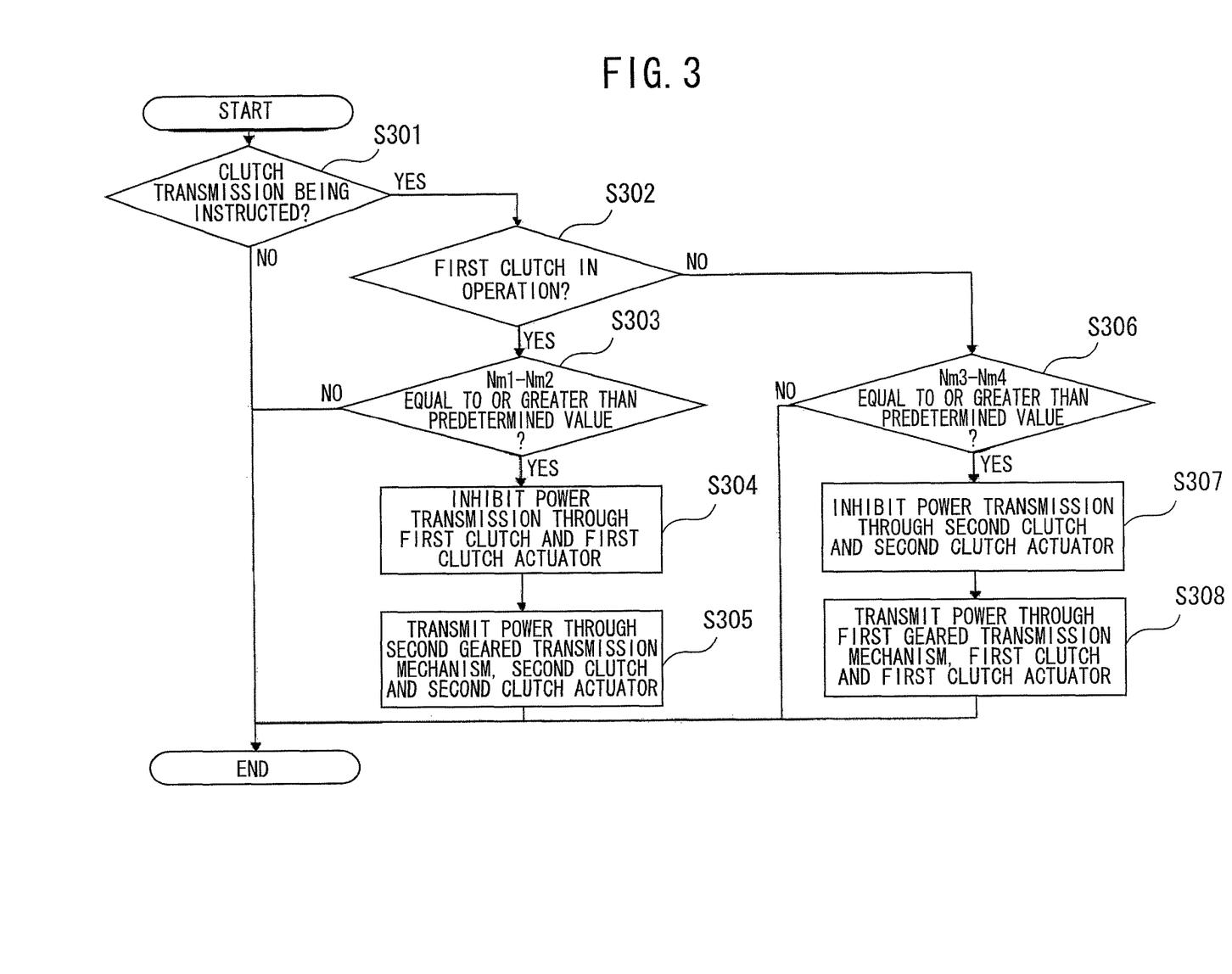
FIG. 3 is a flowchart illustrating the operation of a transmission control apparatus according to a second embodiment of the invention.

FIG. 3 is a flowchart illustrating the operation of the transmission control apparatus according to the second embodiment. Referring to FIG. 3, in step S301, it is determined whether the clutch actuator controller 107 is instructing the first clutch actuator CA1 and/or the second clutch actuator CA2 to transmit the torque in the first clutch C1 and/or the second clutch C2. When the determination is YES, the flow proceeds to step S302. Otherwise, the subroutine is terminated.

In step S302, it is determined whether the first clutch C1 is in operation. When the first clutch C1 is in operation, the flow proceeds to step S303. Otherwise, the flow proceeds to step S306.

In step S303, it is determined whether slipping has occurred in the first clutch C1 due to the dropping of the power transmission performance. The rotational speed of the first geared transmission mechanism T1 is measured by the first rotation sensor 109, and its value is set as Nm1. The output rotational speed of the first clutch C1 is measured by the second rotation sensor 110, and its value is set as Nm2. If all the power is transmitted, the output values of the two rotation sensors 109, 110 become identical. When Nm1−Nm2 is calculated and the resultant value is equal to or greater than a predetermined value, the flow proceeds to step S304. When the value is less than the predetermined value, on the other hand, the subroutine is terminated.

In step S304, power transmission using the first clutch C1 and the first clutch actuator CA1 is inhibited, and the flow proceeds to step S305.

In step S305, power transmission is carried out using the second clutch C2 and the second clutch actuator CA2, and the subroutine is terminated.

In step S306, it is determined whether slipping has occurred in the second clutch C2 due to the dropping of the power transmission performance. The rotational speed of the second geared transmission mechanism T2 is measured by the third rotation sensor 111, and its value is set as Nm3. The rotational speed of the second clutch C2 is measured by the fourth rotation sensor 112, and its value is set as Nm4. If all the power is transmitted, the output values of the two rotation sensors 111, 112 become identical. When Nm3−Nm4 is calculated and the resultant value is equal to or greater than a predetermined value, the flow proceeds to step S307. When the value is less than the predetermined value, on the other hand, the subroutine is terminated.

In step S307, power transmission using the second clutch C2 and the second clutch actuator CA2 is inhibited, and the flow proceeds to step S308.

In step S308, power transmission is carried out using the first clutch C1 and the first clutch actuator CA1, and the subroutine is terminated.

As apparent from the above, the transmission control apparatus according to the second embodiment can accurately detect the amount of slipping of the first clutch C1 or the second clutch C2 by means of the rotation sensors 109, 110, 111 and 112, so that the transmission control apparatus can detect the performance-dropped state of the clutch actuator CA1, CA2, which could not be detected by the conventional transmission control apparatus, and can prevent a failure in the clutch actuator CA1, CA2. Therefore, the transmission control apparatus can detect the performance-dropped state of the clutch C1, C2 more accurately.

Third Embodiment

Figure 4:
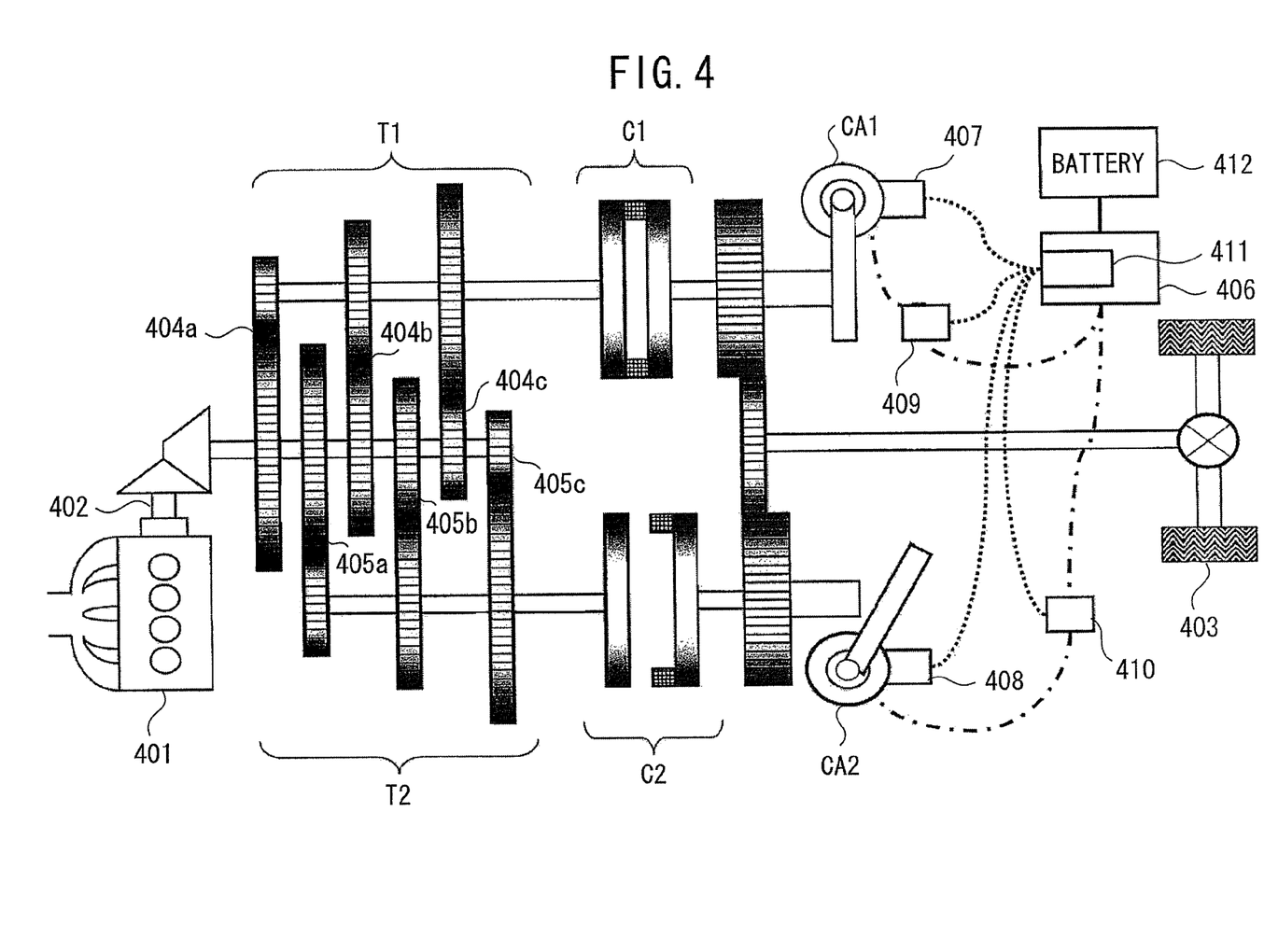
FIG. 4 is a system configurational diagram illustrating a transmission control apparatus according to a third embodiment of the invention.

Next, a transmission control apparatus according to a third embodiment of the invention will be described referring to FIGS. 4 and 5. FIG. 4 is a system configurational diagram illustrating the transmission control apparatus according to the third embodiment. In FIG. 4, an engine 401 outputs power and transmits the power to an engine output shaft 402. The power transmitted from the engine 401 is transmitted to tires 403 through the engine output shaft 402.

The power output from the engine output shaft 402 is transmitted to the first geared transmission mechanism T1 through gears 404a, 404b and 404c provided in the power transmission path of the engine output shaft 402. The first geared transmission mechanism T1 can perform a gear shifting operation by transmitting the power via a specified gear.

Likewise, the power output from the engine output shaft 402 is transmitted to the second geared transmission mechanism T2 through gears 405*a*, 405*b* and 405*c* provided in the power transmission path of the engine output shaft 402, thus ensuring a gear shifting operation.

The powers output from the first geared transmission mechanism T1 and the second geared transmission mechanism T2 are transmitted to the tires 403 via the first clutch C1 and the second clutch C2, respectively. The first clutch C1 and the second clutch C2 are actuated by the first clutch actuator CA1 and the second clutch actuator CA2, respectively. In the embodiment, the first clutch actuator CA1 and the second clutch actuator CA2 are both constituted by an electric motor.

The first clutch actuator CA1 and the second clutch actuator CA2 are controlled by a clutch actuator controller 406 to enable power transmission and disconnection in the first clutch C1 and the second clutch C2.

The temperature of the first clutch actuator CA1 is measured by a first clutch actuator temperature sensor 407, and the temperature of the second clutch actuator CA2 is measured by a second clutch actuator temperature sensor 408. A first current sensor 409 measures the current which flows when the first clutch actuator CA1 is operated, and a second current sensor 410 measures the current which flows when the second clutch actuator CA2 is operated.

The clutch actuator controller 406 has power transmission performance drop detecting means 411, and can acquire information from the first clutch actuator temperature sensor 407, the second clutch actuator temperature sensor 408, the first current sensor 409 and the second current sensor 410. The clutch actuator controller 406 is configured to be able to detect a drop in power transmission performance via the first clutch C1 and a drop in power transmission performance via the second clutch C2 based on the information. Reference numeral "412" denotes a battery which is the power supply for the clutch actuator controller 406. In FIG. 4, one-dot chain lines indicate control signal paths, and broken lines indicate sensor signal paths.

Figure 5:
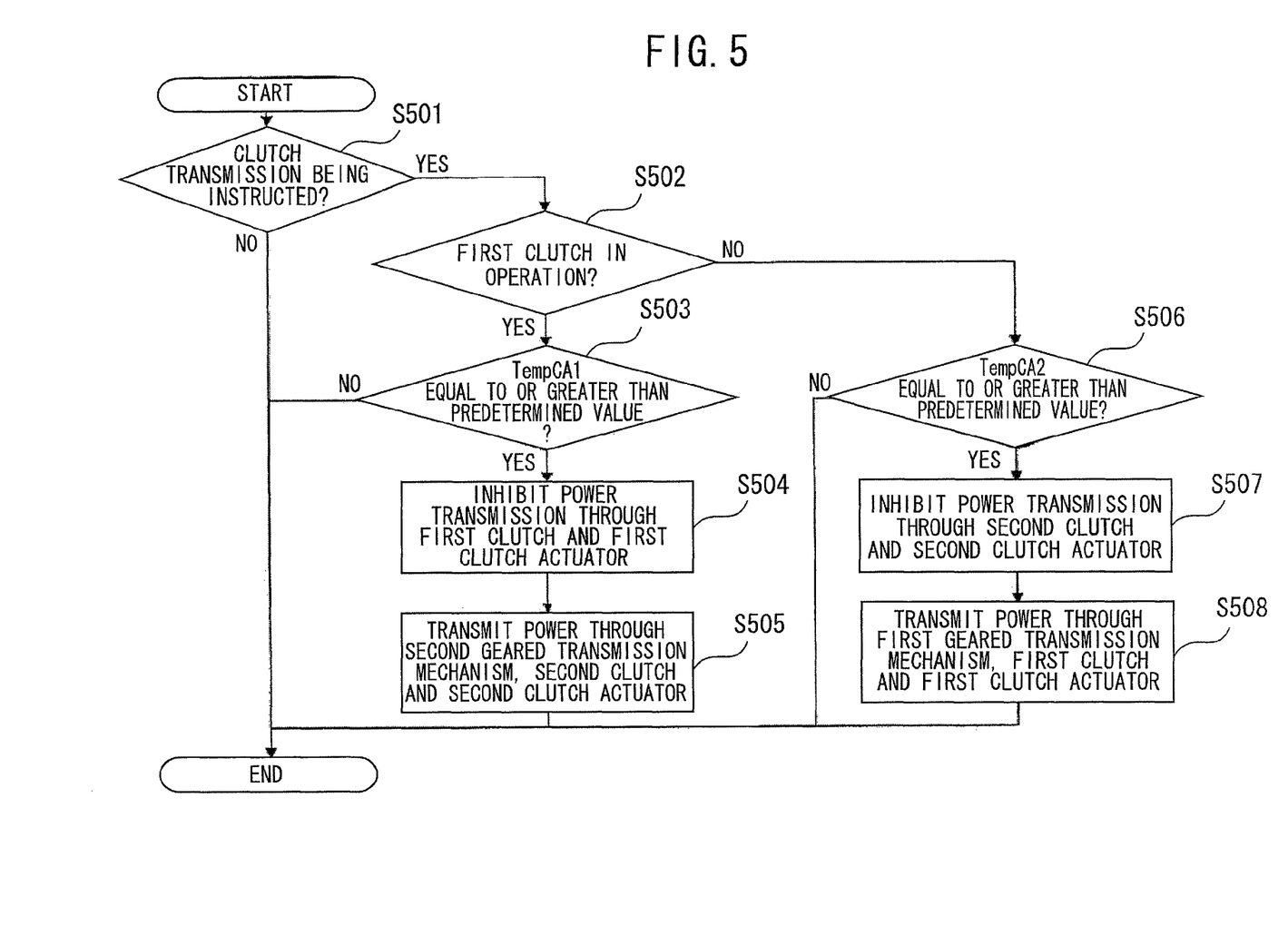
FIG. 5 is a flowchart illustrating the operation of the transmission control apparatus according to the third embodiment of the invention.

FIG. 5 is a flowchart illustrating the operation of the transmission control apparatus according to the third embodiment. Referring to FIG. 5, in step S501, it is determined whether the clutch actuator controller 406 is instructing the first clutch actuator CA1 or the second clutch actuator CA2 to transmit the torque in the first clutch C1 or the second clutch C2. When the determination is YES, the flow proceeds to step S502. Otherwise, the subroutine is terminated.

In step S502, it is determined whether the first clutch C1 is in operation. The flow proceeds to step S503 when the first clutch C1 is in operation, and proceeds to step S506 when the second clutch C2 is in operation.

In step S503, it is determined whether the power transmission performance of the first clutch C1 has dropped. The torque generated in the first clutch actuator CA1 is proportional to the size of the magnetic flux of the magnet which constitutes the first clutch actuator CA1, and the size of the torque becomes smaller as the temperature becomes higher, so that at a high temperature, a sufficient tightening torque cannot be generated, thus lowering the power transmission performance in the first clutch C1. In this respect, when the temperature, TempCA1, of the first clutch actuator CA1 measured by the first clutch actuator temperature sensor 407 is equal to or higher than a predetermined value, it is determined that the power transmission performance in the first clutch C1 is low, and the flow proceeds to step S504. When the temperature TempCA1 is less than the predetermined value, it is determined that the power transmission performance in the first clutch C1 is not low, and the subroutine is terminated.

In step S504, power transmission using the first clutch C1 and the first clutch actuator CA1 is inhibited, and the flow proceeds to step S505.

In step S505, power transmission is carried out using the second clutch C2 and the second clutch actuator CA2, and the subroutine is terminated.

In step S506, it is determined whether the power transmission performance of the second clutch C2 has dropped. The torque generated in the second clutch actuator CA2 is proportional to the size of the magnetic flux of the magnet which constitutes the second clutch actuator CA2, and the size of the torque becomes smaller as the temperature becomes higher, so that at a high temperature, a sufficient tightening torque cannot be generated, thus lowering the power transmission performance in the second clutch C2. In this respect, when the temperature, TempCA2, of the second clutch actuator CA2 measured by the second clutch actuator temperature sensor 408 is equal to or higher than a predetermined value, it is determined that the power transmission performance in the second clutch C2 is low, and the flow proceeds to step S507. When the temperature TempCA2 is less than the predetermined value, it is determined that the power transmission performance in the second clutch C2 is not low, and the subroutine is terminated.

In step S507, power transmission using the second clutch C2 and the second clutch actuator CA2 is inhibited, and the flow proceeds to step S508.

In step S508, power transmission is carried out using the first clutch C1 and the first clutch actuator CA1, and the subroutine is terminated.

As apparent from the above, the transmission control apparatus according to the third embodiment can accurately detect the temperatures of the first and second clutch actuators CA1, CA2 by means of the first and second clutch actuator temperature sensors 407, 408, so that the transmission control apparatus can detect the performance-dropped states of the first and second clutch actuators CA1, CA2, which could not be detected by the conventional transmission control apparatus, and can prevent failures in the first and second clutch actuators CA1, CA2. Therefore, the transmission control apparatus can detect the performance-dropped states of the first and second clutch actuators CA1, CA2 more accurately than the transmission control apparatus of the first embodiment or the second embodiment.

Fourth Embodiment

Next, a transmission control apparatus according to a fourth embodiment of the invention will be described referring to FIG. 6. Because the system configuration is similar to that of the transmission control apparatus explained in the foregoing description of the third embodiment, FIG. 4 will be used.

Figure 6:
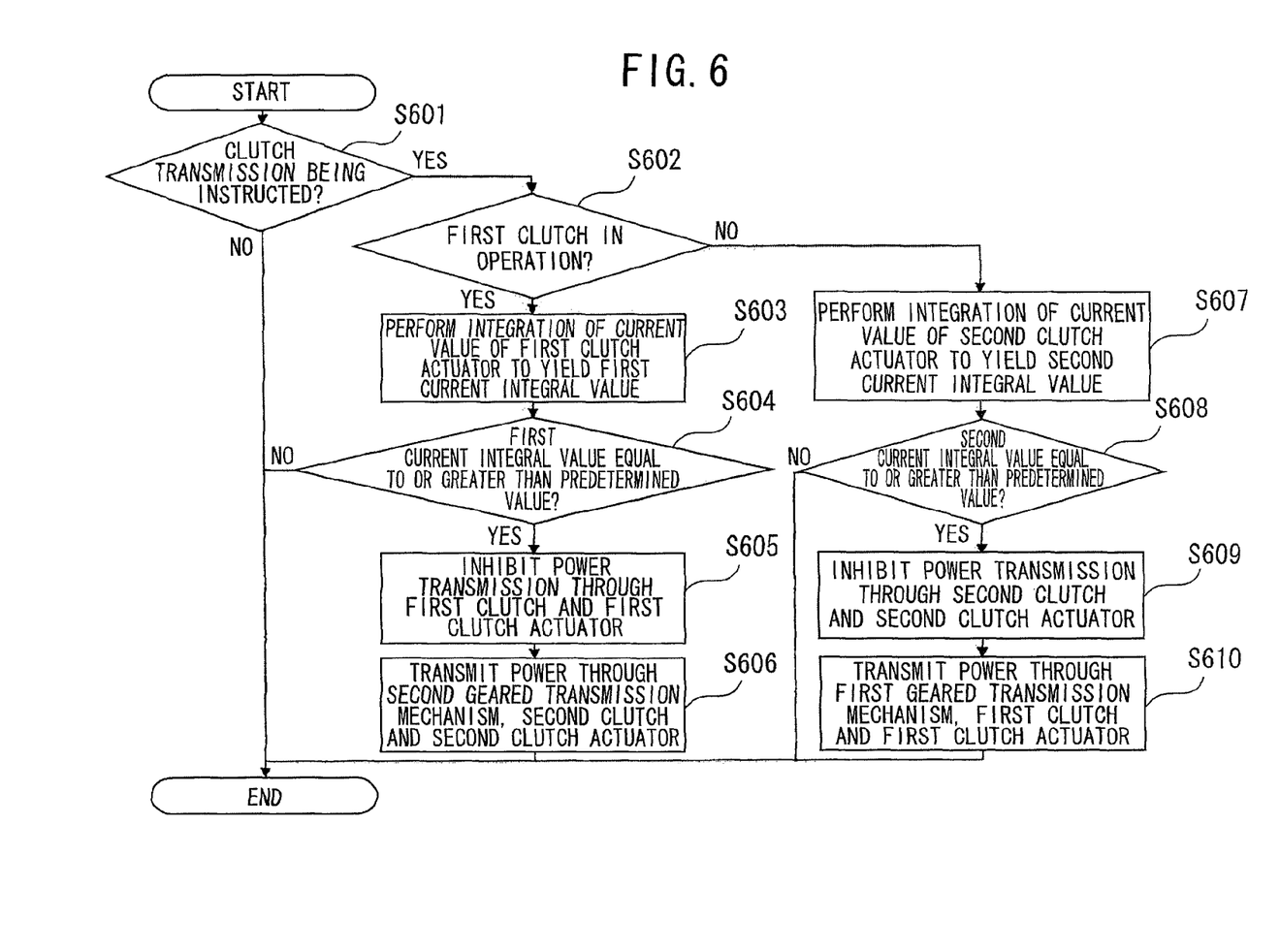
FIG. 6 is a flowchart illustrating the operation of a transmission control apparatus according to a fourth embodiment of the invention.

FIG. 6 is a flowchart illustrating the operation of the transmission control apparatus according to the fourth embodiment. Referring to FIG. 6, in step S601, it is determined whether the clutch actuator controller 406 is instructing the first clutch actuator CA1 or the second clutch actuator CA2 to transmit the torque in the first clutch C1 or the second clutch C2. When the determination is YES, the flow proceeds to step S602. Otherwise, the subroutine is terminated.

In step S602, it is determined whether the first clutch C1 is in operation. When the first clutch C1 is in operation the flow proceeds to step S603. Otherwise, the flow proceeds to step S607.

In step S603, the current since the operation of the first clutch C1 has started is integrated using the following equation 1, and the flow then proceeds to step S604.

$$\text{Integral Cur1}(n) = \text{Integral } Cur1(n-1) + Cur1 \times S\_Time \quad (1)$$

where Integral Cur1($n$) is the current integral value (present calculated value) of the first clutch actuator CA1, Integral Cur1($n-1$) is the current integral value (previous calculated value) of the first clutch actuator CA1, Cur1 is the present value of the current flowing in the first clutch actuator CA1, and S_Time is the time from the time of the previous calculation to the time of the present calculation.

In step S604, it is determined from the current integral value whether the power transmission performance of the first clutch C1 has dropped. The torque generated in the first clutch actuator CA1 is proportional to the size of the magnetic flux of the magnet which constitutes the first clutch actuator CA1, and the size of the torque becomes smaller as the temperature becomes higher, so that at a high temperature, a sufficient tightening torque cannot be generated, thus lowering the power transmission performance in the first clutch C1.

The temperature rise of the first clutch actuator CA1 is proportional to the quantity of power supplied into the first clutch actuator CA1 unless the first clutch actuator CA1 is heated externally. The quantity of power is actuated from the square of the current and the resistance, so that given that the resistance is constant, the quantity of power is proportional to the square of the current. This makes it possible to predict a temperature rise in the first clutch actuator CA1 based the integral value of the current.

In view of the above, in step S604, when the current integral value Integral Cur1($n$) of the first clutch actuator CA1 calculated in step S603 is equal to or greater than a predetermined value, it is predicted that the internal temperature of the first clutch actuator CA1 becomes high, and it is thus determined that the power transmission performance in the first clutch C1 has dropped, so that the flow proceeds to step S605. When the current integral value Integral Cur1($n$) of the first clutch actuation CA1 is less than the predetermined value, it is determined that the power transmission performance in the first clutch C1 has not dropped, and the subroutine is terminated.

In step S605, power transmission using the first clutch C1 and the first clutch actuator CA1 is inhibited, and the flow proceeds to step S606.

In step S606, power transmission is carried out using the second clutch C2 and the second clutch actuator CA2, and the subroutine is terminated.

In step S607, the current since the operation of the second clutch C2 has started is integrated using the following equation 2, and the flow then proceeds to step S608.

$$\text{Integral } Cur2(n) = \text{Integral } Cur2(n-1) + Cur2 \times S\_Time \quad (2)$$

where Integral Cur2($n$) is the current integral value (present calculated value) of the second clutch actuator CA2, Integral Cur2($n-1$) is the current integral value (previous calculated value) of the second clutch actuator CA2. Cur2 is the present value of the current flowing in the second clutch actuator CA2, and S_Time is the time from the time of the previous calculation to the time of the present calculation.

In step S608, it is determined from the current integral value whether the power transmission performance of the second clutch C2 has dropped. The torque generated in the second clutch actuator CA2 is proportional to the size of the magnetic flux of the magnet which constitutes the second clutch actuator CA2, and the size of the torque becomes smaller as the temperature becomes higher, so that at a high temperature, a sufficient tightening torque cannot be generated, thus lowering the power transmission performance in the second clutch C2.

The temperature rise of the second clutch actuator CA2 is proportional to the quantity of power supplied into the second clutch actuator CA2 unless the second clutch actuator CA2 is heated externally. The quantity of power is actuated from the square of the current and the resistance, so that given that the resistance is constant, the quantity of power is proportional to the square of the current. This makes it possible to predict a temperature rise in the second clutch actuator CA2 based the integral value of the current.

In view of the above, in step S608, when the current integral value Integral Cur2($n$) of the second clutch actuator CA2 calculated in step S607 is equal to or greater than a predetermined value, it is predicted that the internal temperature of the second clutch actuator CA2 becomes high, and it is thus determined that the power transmission performance in the second clutch C2 has dropped, so that the flow proceeds to step S609. When the current integral value Integral Cur2($n$) is less than the predetermined value, it is determined that the power transmission performance in the second clutch C2 has not dropped, and the subroutine is terminated.

In step S609, power transmission using the second clutch C2 and the second clutch actuator CA2 is inhibited, and the flow proceeds to step S610.

In step S610, power transmission is carried out using the first clutch C1 and the first clutch actuator CA1, and the subroutine is terminated.

As apparent from the above, the transmission control apparatus according to the fourth embodiment can predict the operational states of the first and second clutch actuators CA1, CA2 by measuring the currents flowing in the first and second clutch actuators CA1, CA2, so that the transmission control apparatus can detect the performance-dropped states of the first and second clutch actuators CA1, CA2, which could not be detected by the conventional transmission control apparatus, can prevent failures in the first and second clutch actuators CA1, CA2, and can thus be realized with a simpler configuration than the transmission control apparatuses of the first to third embodiments.

Fifth Embodiment

Figure 7:
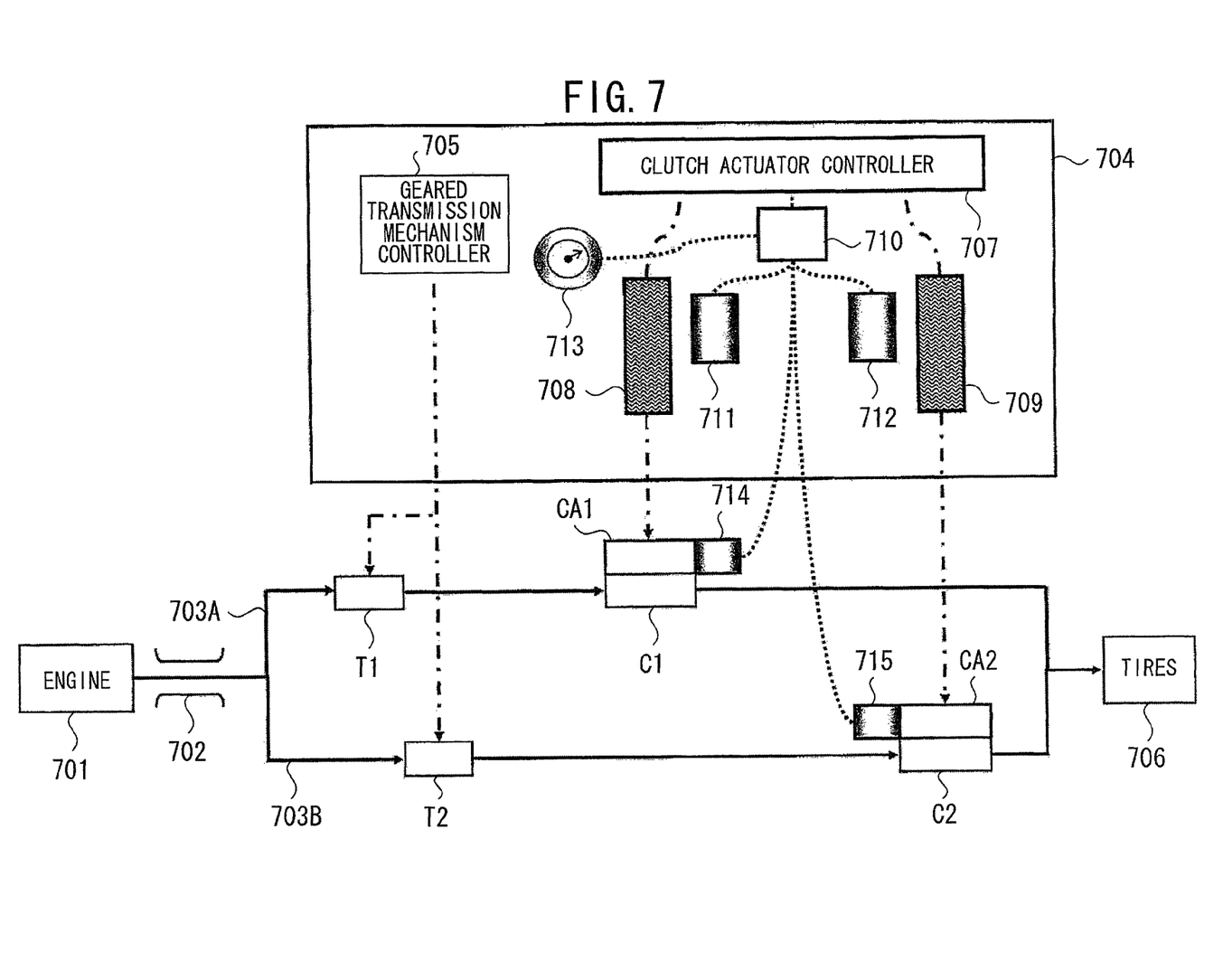
FIG. 7 is a system configurational diagram illustrating the operation of a transmission control apparatus according to a fifth embodiment of the invention.

Next, a transmission control apparatus according to a fifth embodiment of the invention will be described referring to FIGS. 7 and 8. FIG. 7 is a system configurational diagram illustrating the transmission control apparatus according to the fifth embodiment of the invention. In FIG. 7, an engine 701 outputs power and transmits the power to an engine output shaft 702. The power transmitted to the engine output shaft 702 is transmitted to a first geared transmission mechanism T1 through a first power transmission path 703A. The first geared transmission mechanism T1 can perform a gear shifting operation as the power is transmitted by the gear that is specified by a geared transmission mechanism controller 705 which constitutes a transmission control apparatus 704.

Likewise, the power transmitted to the engine output shaft 702 is transmitted to a second geared transmission mechanism T2 through the second power transmission path 703B. The geared transmission mechanism controller 705 also gives an instruction to the second geared transmission mechanism T2 to enable a gear shifting operation.

The powers output from the first geared transmission mechanism T1 and the second geared transmission mechanism T2 are transmitted to tires 706 via the first clutch C1 and the second clutch C2, respectively.

With the foregoing configuration, the power from the engine 701 is transmitted through the engine output shaft 702, and is then transmitted through the first power transmission path 703A and the second power transmission path 703B to the first geared transmission mechanism T1 and the second geared transmission mechanism T2, respectively. The powers transmitted to the first geared transmission mechanism T1 and the second geared transmission mechanism T2 are transmitted to the tires 706 through any one of the first power transmission path 703A and the second power transmission path 703B selected by the first clutch C1 and the second clutch C2, respectively.

The first clutch C1 and the second clutch C2 are respectively actuated by the first clutch actuator CA1 and the second clutch actuator CA2. The first clutch actuator CA1 and the second clutch actuator CA2 are operated to enable power transmission and disconnection in the first clutch C1 and the second clutch C2 as a first clutch actuator drive circuit 708 and a second clutch actuator drive circuit 709 are driven in response to an instruction from a clutch actuator controller 707 constituting the transmission control apparatus 704.

The transmission control apparatus 704 incorporates power transmission performance drop detecting means 710 which detects a drop in the torque transmitting performance in the first power transmission path 703A or the second power transmission path 703B. The power transmission performance drop detecting means 710 is configured to be able to detect drops in the torque transmitting performances in the first clutch C1 and the second clutch C2 before and after the first and second clutches C1, C2 from information from a first board temperature sensor 711 and a second board temperature sensor 712, which are respectively disposed near the first clutch actuator drive circuit 708 and the second clutch actuator drive circuit 709 to measure the ambient temperatures thereof.

The power transmission performance drop detecting means 710 is also configured to be able to determine that the first clutch actuator CA1 and the second clutch actuator CA2 can transmit power, from information from a the first board temperature sensor 711 and the second board temperature sensor 712, and information from a time measuring counter 713 which measures the time elapsed since the first clutch actuator CA1 or the second clutch actuator CA2 is prevented from transmitting power. In FIG. 7, reference numeral "714" denotes a first clutch actuator temperature sensor which measures the temperature of the first clutch actuator CA1, and reference numeral "715" denotes a second clutch actuator temperature sensor which measures the temperature of the second clutch actuator CA2. In FIG. 7, solid lines indicate power transmission paths, one-dot chain lines indicate control signal paths, and broken lines indicate sensor signal paths.

Figure 8:
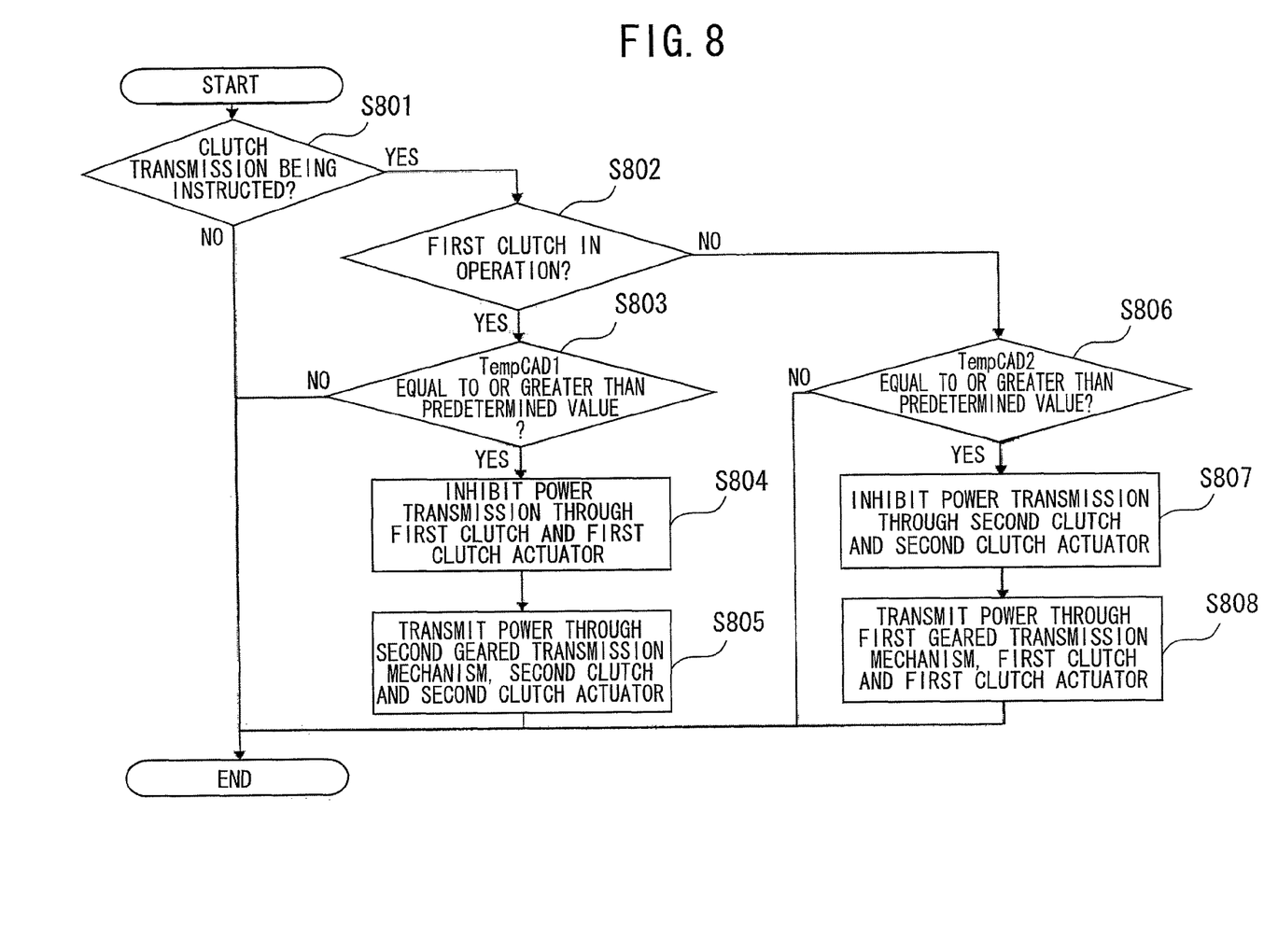
FIG. 8 is a flowchart illustrating the operation of the transmission control apparatus according to the fifth embodiment of the invention.

FIG. 8 is a flowchart illustrating the operation of the transmission control apparatus according to the fifth embodiment of the invention. Referring to FIG. 8, in step S801, it is determined whether the clutch actuator controller 707 is instructing the first clutch actuator CA1 or the second clutch actuator CA2 to transmit the torque in the first clutch C1 or the second clutch C2. When the determination is YES, the flow proceeds to step S802. Otherwise, the subroutine is terminated.

In step S802, it is determined whether the first clutch C1 is in operation. When the first clutch C1 is in operation the flow proceeds to step S803. Otherwise, the flow proceeds to step S806.

In step S803, it is determined whether the power transmission performance of the first clutch C1 has dropped. The torque generated in the first clutch actuator CA1 is proportional to the size of the magnetic flux of the magnet which constitutes the first clutch actuator CA1, and the size of the torque becomes smaller as the temperature becomes higher, so that at a high temperature, a sufficient tightening torque cannot be generated, thus lowering the power transmission performance in the first clutch C1.

The temperature rise of the first clutch actuator CA1 is proportional to the quantity of power supplied into the first clutch actuator CA1 unless the first clutch actuator CA1 is heated externally. The quantity of power is actuated from the square of the current and the resistance, so that given that the resistance is constant, the quantity of power is proportional to the square of the current.

The sizes of the currents flowing in the first clutch actuator drive circuit 708 and the first clutch actuator CA1 are equal to each other, and there is a resistance in the first clutch actuator drive circuit 708, so that the energy used in the first clutch actuator CA1 in raising the temperature is proportional to the energy used in the first clutch actuator drive circuit 708 in raising the temperature. Accordingly, a temperature rise in the first clutch actuator CA1 can be predicted by measuring the ambient temperature of the first clutch actuator drive circuit 708.

Given that the ambient temperature of the first clutch actuator drive circuit 708, which is measured by the first board temperature sensor 711, is TempCAD1, when TempCAD1 is equal to or higher than a predetermined value, it is determined that the power transmission performance in the first clutch C1 has dropped, and the flow proceeds to step S804. When the TempCAD1 is less than the predetermined value, it is determined that the power transmission performance in the first clutch C1 has not dropped. Otherwise, the subroutine is terminated.

In step S804, power transmission using the first clutch C1 and the first clutch actuator CA1 is inhibited, and the flow proceeds to step S805.

In step S805, power transmission is carried out using the second clutch C2 and the second clutch actuator CA2, and the subroutine is terminated.

In step S806, it is determined whether the power transmission performance of the second clutch C2 has dropped. The torque generated in the second clutch actuator CA2 is proportional to the size of the magnetic flux of the magnet which constitutes the second clutch actuator CA2, and the size of the torque becomes smaller as the temperature becomes higher, so that at a high temperature, a sufficient tightening torque cannot be generated, thus lowering the power transmission performance in the second clutch C2.

The temperature rise of the second clutch actuator CA2 is proportional to the quantity of power supplied into the second clutch actuator CA2 unless the second clutch actuator CA2 is heated externally. The quantity of power is actuated from the square of the current and the resistance, so that given that the resistance is constant, the quantity of power is proportional to the square of the current.

The sizes of the currents flowing in the second clutch actuator drive circuit 709 and the second clutch actuator CA2 are equal to each other, and there is a resistance in the second clutch actuator drive circuit 709, so that the energy used in the second clutch actuator CA2 in raising the temperature is proportional to the energy used in the second clutch actuator drive circuit 709 in raising the temperature.

Accordingly, a temperature rise in the second clutch actuator CA2 can be predicted by measuring the ambient temperature of the second clutch actuator drive circuit 709. Given that the ambient temperature of the second clutch actuator drive circuit 709, which is measured by the second board temperature sensor 712, is TempCAD2, when TempCAD2 is equal to or higher than a predetermined value, it is determined that the power transmission performance in the second clutch C2 has dropped, and the flow proceeds to step S807. When the TempCAD2 is less than the predetermined value, it is determined that the power transmission performance in the second clutch C2 has not dropped. Otherwise, the subroutine is terminated.

In step S807, power transmission using the second clutch C2 and the second clutch actuator CA2 is inhibited, and the flow proceeds to step S808.

In step S808, power transmission is carried out using the first clutch C1 and the first clutch actuator CA1, and the subroutine is terminated.

As apparent from the above, by measuring the ambient temperatures of the first and second clutch actuator drive circuits 708, 709, the transmission control apparatus according to the fifth embodiment can detect the performance-dropped states of the first and second clutch actuators CA1, CA2, which could not be detected by the conventional transmission control apparatus, and can prevent failures in the first and second clutch actuators CA1, CA2. Further, the structure where the temperature sensors 711, 712 are disposed in the transmission control apparatus 704 requires shorter wirings from the transmission control apparatus 704 to the temperature sensors 711, 712, so that the transmission control apparatus 704 can be realized with a simpler and inexpensive configuration than the transmission control apparatuses of the first to fourth embodiments.

Sixth Embodiment

Next, a transmission control apparatus according to a sixth embodiment of the invention will be described referring to FIG. 9. Because the system configuration is similar to that of the transmission control apparatus explained in the foregoing description of the fifth embodiment, FIG. 7 will be used.

Figure 9:
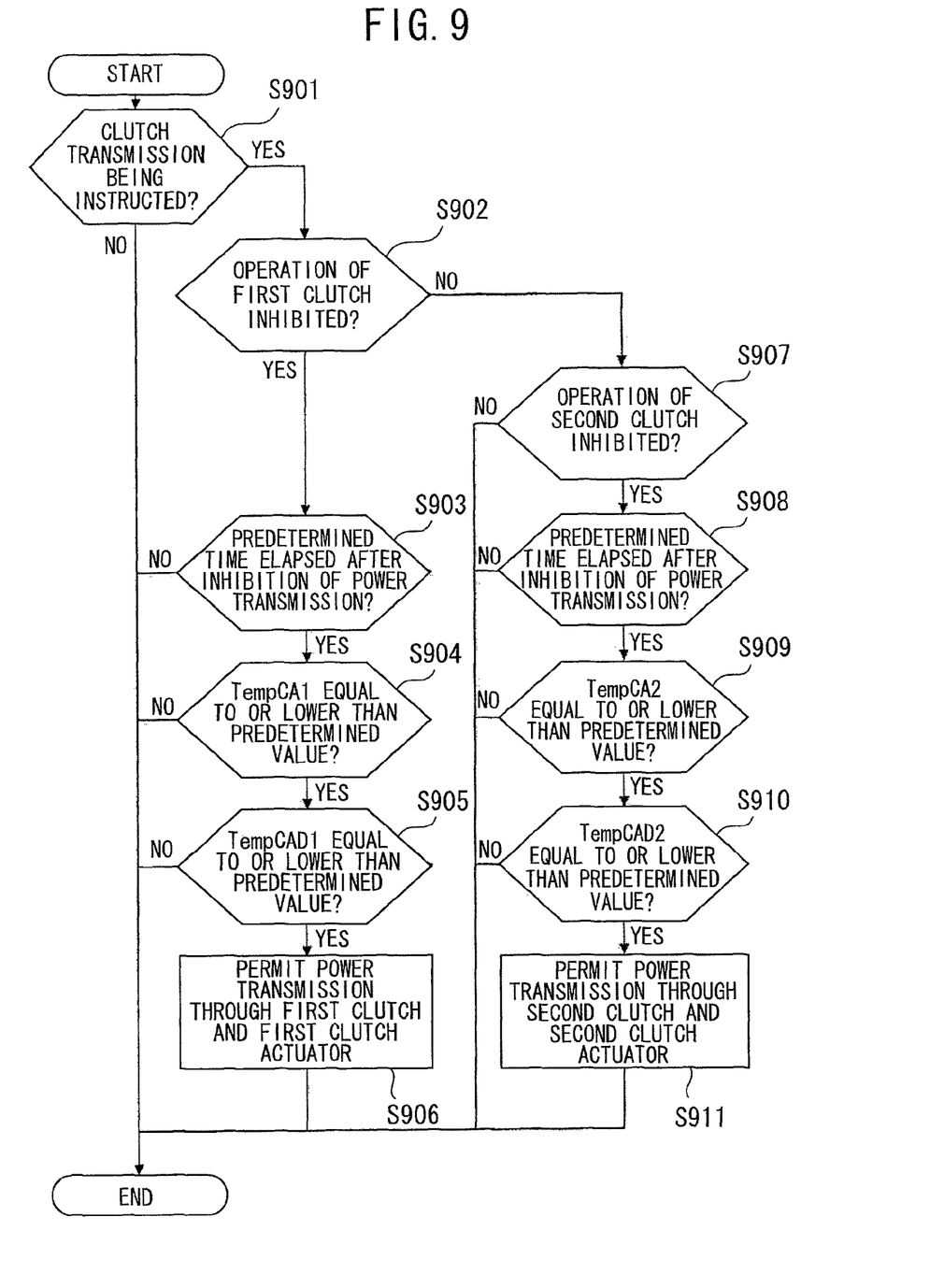
FIG. 9 is a flowchart illustrating the operation of a transmission control apparatus according to a sixth embodiment of the invention.

FIG. 9 is a flowchart illustrating the operation of the transmission control apparatus according to the sixth embodiment. Referring to FIG. 9, in step S901, it is determined whether the clutch actuator controller 707 is instructing the first clutch actuator CA1 or the second clutch actuator CA2 to transmit the torque in the first clutch C1 or the second clutch C2. When the determination is YES, the flow proceeds to step S902. Otherwise, the subroutine is terminated.

In step S902, when the power transmission in the first clutch C1 is inhibited, the flow proceeds to step S903. Otherwise, the flow proceeds to step S907.

In steps S903 to S905, it is determined whether the power transmission performance of the first clutch C1 has been recovered. The torque generated in the first clutch actuator CA1 is proportional to the size of the magnetic flux of the magnet which constitutes the first clutch actuator CA1, and the size of the torque becomes smaller as the temperature becomes higher, so that at a high temperature, a sufficient tightening torque cannot be generated, thus lowering the power transmission performance in the first clutch C1. When the clutch actuator is used under the environment where the ambient temperature changes within the range in which the ambient temperature is limited to a certain level lower than the use limit temperature of the first clutch actuator CA1, if the driving of the first clutch actuator CA1 is stopped after the driving of the first clutch actuator CA1 increases the temperature, the temperature approaches the ambient temperature with the elapse of the time, and thus eventually reaches the temperature range where the torque needed for power transmission can be generated.

In view of the above, in step S903, the time since the inhibition of the power transmission of the clutch actuator is measured, and when a predetermined time has elapsed since the inhibition of the power transmission of the first clutch actuator CA1, the flow proceeds to step S904. When the predetermined time has not elapsed, it is considered that the power transmission performance in the first clutch C1 has not been recovered, and the subroutine is terminated.

In step S904, the temperature of the first clutch actuator CA1 is measured by the first clutch actuator temperature sensor 714 and the measured value is set as TempCA1. When the TempCA1 is equal to or lower than a predetermined value, the flow proceeds to step S905. Otherwise, it is considered that the power transmission performance in the first clutch C1 has not been recovered, and the subroutine is terminated.

The temperature rise of the first clutch actuator CA1 is proportional to the quantity of power supplied into the first clutch actuator CA1 unless the first clutch actuator CA1 is heated externally. The quantity of power is actuated from the square of the current and the resistance, so that given that the resistance is constant, the quantity of power is proportional to the square of the current. The sizes of the currents flowing in the first clutch actuator drive circuit 708 and the first clutch actuator CA1 are equal to each other, and there is a resistance in the first clutch actuator drive circuit 708, so that the energy used in the first clutch actuator CA1 in raising the temperature is proportional to the energy used in the first clutch actuator drive circuit 708 in raising the temperature.

Accordingly, a temperature rise in the first clutch actuator CA1 can be predicted by measuring the ambient temperature of the first clutch actuator drive circuit 708. In step S905, therefore, when the temperature, TempCAD1, of the first clutch actuator drive circuit 708, which is measured by the first board temperature sensor 711, is equal to or lower than a predetermined value, the flow proceeds to step S906. When the TempCAD1 is higher than the predetermined value, it is considered that the power transmission performance in the first clutch C1 has not been recovered, and the subroutine is terminated.

In step S906, because it can be predicted from the decisions made in steps S903 to S905 that the power transmission performance in the first clutch C1 has been recovered, the power transmission using the first clutch C1 which has been inhibited is released (permitted), and the subroutine is terminated.

In step S907, when the power transmission in the second clutch C2 is inhibited, the flow proceeds to step S908. Otherwise, the subroutine is terminated.

In steps S908 to S910, it is determined whether the power transmission performance of the second clutch C2 has been recovered. The torque generated in the second clutch actuator CA2 is proportional to the size of the magnetic flux of the magnet which constitutes the second clutch actuator CA2, and the size of the torque becomes smaller as the temperature becomes higher, so that at a high temperature, a sufficient tightening torque cannot be generated, thus lowering the power transmission performance in the second clutch C2. When the clutch actuator is used under the environment where the ambient temperature changes within the range in which the ambient temperature is limited to a certain level lower than the use limit temperature of the second clutch actuator CA2, if the driving of the second clutch actuator CA2 is stopped after the driving of the second clutch actuator CA2 increases the temperature, the temperature approaches the ambient temperature with the elapse of the time, and thus eventually reaches the temperature range where the torque needed for power transmission can be generated.

In view of the above, in step S908, the time since the inhibition of the power transmission of the clutch actuator is measured, and when a predetermined time has elapsed since the inhibition of the power transmission of the second clutch actuator CA2, the flow proceeds to step S909. When the predetermined time has not elapsed, it is considered that the power transmission performance in the second clutch C2 has not been recovered, and the subroutine is terminated.

In step S909, the temperature of the second clutch actuator CA2 is measured by the second clutch actuator temperature sensor 715 and the measured value is set as TempCA2. When the TempCA2 is equal to or lower than a predetermined value, the flow proceeds to step S910. Otherwise, it is considered that the power transmission performance in the second clutch C2 has not been recovered, and the subroutine is terminated.

The temperature rise of the second clutch actuator CA2 is proportional to the quantity of power supplied into the second clutch actuator CA2 unless the second clutch actuator CA2 is heated externally. The quantity of power is actuated from the square of the current and the resistance, so that given that the resistance is constant, the quantity of power is proportional to the square of the current. The sizes of the currents flowing in the second clutch actuator drive circuit 709 and the second clutch actuator CA2 are equal to each other, and there is a resistance in the second clutch actuator drive circuit 709, so that the energy used in the second clutch actuator CA2 in raising the temperature is proportional to the energy used in the second clutch actuator drive circuit 709 in raising the temperature.

Accordingly, a temperature rise in the second clutch actuator CA2 can be predicted by measuring the ambient temperature of the second clutch actuator drive circuit 709. In step S910, therefore, when the temperature, TempCAD2, of the second clutch actuator drive circuit 709, which is measured by the second board temperature sensor 712, is equal to or lower than a predetermined value, the flow proceeds to step S911. When the TempCAD2 is higher than the predetermined value, it is considered that the power transmission performance in the second clutch C2 has not been recovered, and the subroutine is terminated.

In step S911, because it can be predicted from the decisions made in steps S908 to S910 that the power transmission performance in the second clutch C2 has been recovered, the power transmission using the second clutch C2 which has been inhibited is released (permitted), and the subroutine is terminated.

As apparent from the above, the transmission control apparatus according to the sixth embodiment is configured to release the inhibited operation of the clutch actuator when a predetermined condition is fulfilled, the transmission control apparatus can detect the performance-dropped states of the first and second clutch actuators CA1, CA2, which could not be detected by the conventional transmission control apparatus, and can prevent failures in the first and second clutch actuators CA1, CA2. Further, gear shifting by a group of the geared transmission mechanism and clutch whose operations are inhibited, which cannot be achieved by the first to fifth embodiments, can be enabled again.

The transmission control apparatus according to the present invention can control the transmission which separates power from an engine to two power transmission paths each having an independent clutch and an independent transmission mechanism.

Various modifications and alterations of this invention will be apparent to those skilled in the art without departing from the scope and spirit of this invention, and it should be understood that this is not limited to the illustrative embodiments set forth herein.

What is claimed is:

1. A transmission control apparatus for controlling a transmission having an engine output shaft that transmits an output torque of an engine, a first geared transmission mechanism that transmits power of the engine output shaft to a tire, a second geared transmission mechanism that transmits the power of the engine output shaft to the tire, a first clutch provided in a power transmission path extending from the engine output shaft to the tire through the first geared transmission mechanism to transmit or disconnect power, a second clutch provided in a power transmission path extending from the engine output shaft to the tire through the second geared transmission mechanism to transmit or disconnect power, a first clutch actuator that is actuated by an electric signal to operate the first clutch, and a second clutch actuator that is actuated by an electric signal to operate the second clutch, the transmission control apparatus comprising:

a clutch actuator controller that controls the first clutch actuator and the second clutch actuator; and power transmission performance drop detecting means that detects or predicts a drop in power transmission performance of the first clutch actuator or the second clutch actuator, wherein when the power transmission performance drop detecting means detects a drop in power transmission performance of the first clutch even if the clutch actuator controller is giving an instruction of power transmission to the first clutch actuator, power transmission in the power transmission path extending from the engine output shaft to the tire through the first geared transmission mechanism is inhibited, and power transmission in the power transmission path extending from the engine output shaft to the tire through the second geared transmission mechanism is enabled, and when the power transmission performance drop detecting means detects a drop in power transmission performance of the second clutch even if the clutch actuator controller is giving an instruction of power transmission to the second clutch actuator, power transmission in the power transmission path extending from the engine output shaft to the tire through the second geared transmission mechanism is inhibited, and power transmission in the power transmission path extending from the engine output shaft to the tire through the first geared transmission mechanism is enabled.

2. The transmission control apparatus according to claim 1, wherein the power transmission performance drop detecting means receives information from first and second rotational speed sensors which respectively measure rotational speeds before and after the first clutch, and information from third and fourth rotational speed sensors which respectively measure rotational speeds before and after the second clutch, detects a drop in power transmission performance of the first clutch when a difference between the rotational speeds measured by the first and second rotational speed sensors becomes a predetermined value or greater, and detects a drop in power transmission performance of the second clutch when a difference between the rotational speeds measured by the third and fourth rotational speed sensors becomes a predetermined value or greater.

3. The transmission control apparatus according to claim 1, wherein the power transmission performance drop detecting means receives information from a first clutch actuator temperature sensor which measures a temperature of the first clutch actuator, and information from a second clutch actuator temperature sensor which measures a temperature of the second clutch actuator, wherein the power transmission performance drop detecting means detects a drop in power transmission performance of the first clutch when the temperature of the first clutch actuator measured by the first clutch actuator temperature sensor becomes a predetermined value or higher, and wherein the power transmission performance drop detecting means detects a drop in power transmission performance of the second clutch when the temperature of the second clutch actuator measured by the second clutch actuator temperature sensor becomes a predetermined value or higher.

4. The transmission control apparatus according to claim 1, wherein the power transmission performance drop detecting means receives information from a first current sensor which measures a current flowing in the first clutch actuator, and information from a second current sensor which measures a current flowing in the second clutch actuator, detects a drop in power transmission performance of the first clutch when a time integral of the current measured by the first current sensor becomes a predetermined value or greater, and detects a drop in power transmission performance of the second clutch when a time integral of the current measured by the second current sensor becomes a predetermined value or greater.

5. The transmission control apparatus according to claim 1, wherein the power transmission performance drop detecting means receives information from a first board temperature sensor which measures an ambient temperature of a first clutch actuator drive circuit provided in the clutch actuator controller to operate the first clutch actuator, and information from a second board temperature sensor which measures an ambient temperature of a second clutch actuator drive circuit provided in the clutch actuator controller to operate the second clutch actuator, detects a drop in power transmission performance of the first clutch which is actuated by the first clutch actuator when the ambient temperature of the first clutch actuator drive circuit measured by the first board temperature sensor becomes a predetermined value or higher, and detects a drop in power transmission performance of the second clutch which is actuated by the second clutch actuator when the ambient temperature of the second clutch actuator drive circuit measured by the second board temperature sensor becomes a predetermined value or higher.

6. The transmission control apparatus according to claim 1, wherein the power transmission in the power transmission path which is inhibited is permitted when at least one of three power transmission permitting conditions is fulfilled in which:

a first power transmission permitting condition is that a predetermined time has elapsed after inhibition of power transmission in the power transmission path extending from the engine output shaft to the tire through the first geared transmission mechanism, or after inhibition of power transmission in the power transmission path extending from the engine output shaft to the tire through the second geared transmission mechanism, a second power transmission permitting condition is that the temperature of the first clutch actuator or the second clutch actuator included in the power transmission path whose power transmission is inhibited becomes a predetermined or lower, and a third power transmission permitting condition is that, given that the transmission control apparatus includes a first clutch actuator drive circuit which operates the first clutch actuator and a second clutch actuator drive circuit which operates the second clutch actuator, an ambient temperature of the first clutch actuator drive circuit or the second clutch actuator drive circuit included in the power transmission path whose power transmission is inhibited becomes a predetermined or lower.

\* \* \* \* \*